United States Patent [19]

Williams

[11] Patent Number: 4,650,968

[45] Date of Patent: Mar. 17, 1987

[54] STEAMER COOKING DEVICE

[76] Inventor: James T. Williams, 6083 Power Inn Rd., Sacramento, Calif. 95824

[21] Appl. No.: 657,484

[22] Filed: Oct. 3, 1984

[51] Int. Cl.⁴ .............................................. A47J 27/04
[52] U.S. Cl. .................... 219/401; 219/385; 126/20; 126/369.2; 99/444; 99/446
[58] Field of Search ............... 219/385, 271, 272, 273, 219/274, 275, 276, 401; 126/20, 20.1, 20.2, 369, 369.1, 369.2, 369.3; 99/419, 425, 444, 445, 446, 467; 422/11, 26

[56] References Cited

U.S. PATENT DOCUMENTS

| 136,588 | 3/1873 | Collins | 126/369 |
|---|---|---|---|
| 157,897 | 12/1874 | Welch | 126/369 |
| 475,678 | 5/1892 | Dexter | 126/369.1 |
| 847,117 | 3/1907 | Salmon | 99/444 |
| 1,339,350 | 5/1920 | Kelley | 99/419 |
| 2,236,992 | 4/1941 | Broadley | 99/446 |
| 2,766,366 | 10/1956 | Eckhoff | 219/273 |
| 2,980,099 | 4/1961 | Klemm | 126/20 |
| 3,456,598 | 7/1969 | MacKay | 219/401 |
| 4,509,412 | 4/1985 | Whittenburg | 126/20 |

FOREIGN PATENT DOCUMENTS

| 271879 | 11/1912 | Fed. Rep. of Germany | 126/369 |
|---|---|---|---|
| 1206114 | 2/1960 | France | 126/369 |

*Primary Examiner*—E. A. Goldberg
*Assistant Examiner*—Teresa J. Walberg

[57] ABSTRACT

A steamer having a base, a water reservoir, a heater for heating the same and a vented cover. The steamer includes a plurality of different cooking surfaces so that a variety of different foods can be steamed at the same time and may include a reversible cooking liquor collector tray for either collecting condensate and liquors during cooking or returning all condensate to the water reservoir. The liquors collected by the tray may be delivered to a reservoir or cup which can be removed from the steamer to make sauces or the like.

19 Claims, 11 Drawing Figures

STEAMER COOKING DEVICE

BACKGROUND OF THE INVENTION

1. Field of the Invention

The invention relates to steamers; and, more particularly, to a steamer for steaming rice or vegetables or the like where a plurality of different foods can be cooked at the same time.

2. Description of the Prior Art

People have become more health conscious in recent years and more attention has been directed to the steaming of foods. For example, valuable minerals are retained in vegetables if they are steamed rather than cooked by other means. At the same time, people doing such cooking are desirous of spending as little time as possible in the kitchen. Thus, automatic steamers and cookers have become popular in recent years.

In such prior art devices, many problems were encountered in steaming foods. For example, if the water being heated boiled away, food matter carried by the condensate would bake onto the heating surface of the water reservoir resulting in undesirable cooking odors and a messy clean up operation. Also, some prior art steamers required heating of a substantial amount of water thereby being less efficient than desired in today's energy concerned times. Such prior art devices also permitted condensate to accumulate with the food being steamed thus making the foods soggy and undesirable.

Finally, such prior art devices steamed only one food at a time and thus could not steam both rice and vegetables simultaneously, for example.

There thus is a need for a steamer which can simultaneously and efficiently steam more than one food item without collection of condensation around foods being steamed nor allow food matter to bake onto the heating surface when water boils away.

SUMMARY OF THE INVENTION

It is an object of this invention to provide an improved steamer for steaming foods.

It is a further object of this invention to provide a steamer which can simultaneously steam a plurality of different foods without contact between the foods.

It is still further an object of this invention to provide a steamer having a removable reservoir for catching liquors from the food being steamed.

It is another object of this invention to provide a steamer which avoids scorching on the heating surface by food liquors given off while steaming.

These and other objects are preferably accomplished by providing a steamer having a base, a water reservoir, a heater for heating the same and a vented cover. The steamer includes a plurality of different cooking surfaces so that a variety of different foods can be steamed at the same time and may include a reversible cooking liquor/condensate collector tray for either collecting liquors during cooking or returning condensate to the heating water reservoir.

DESCRIPTION OF THE PREFERRED EMBODIMENT

Figure 1:
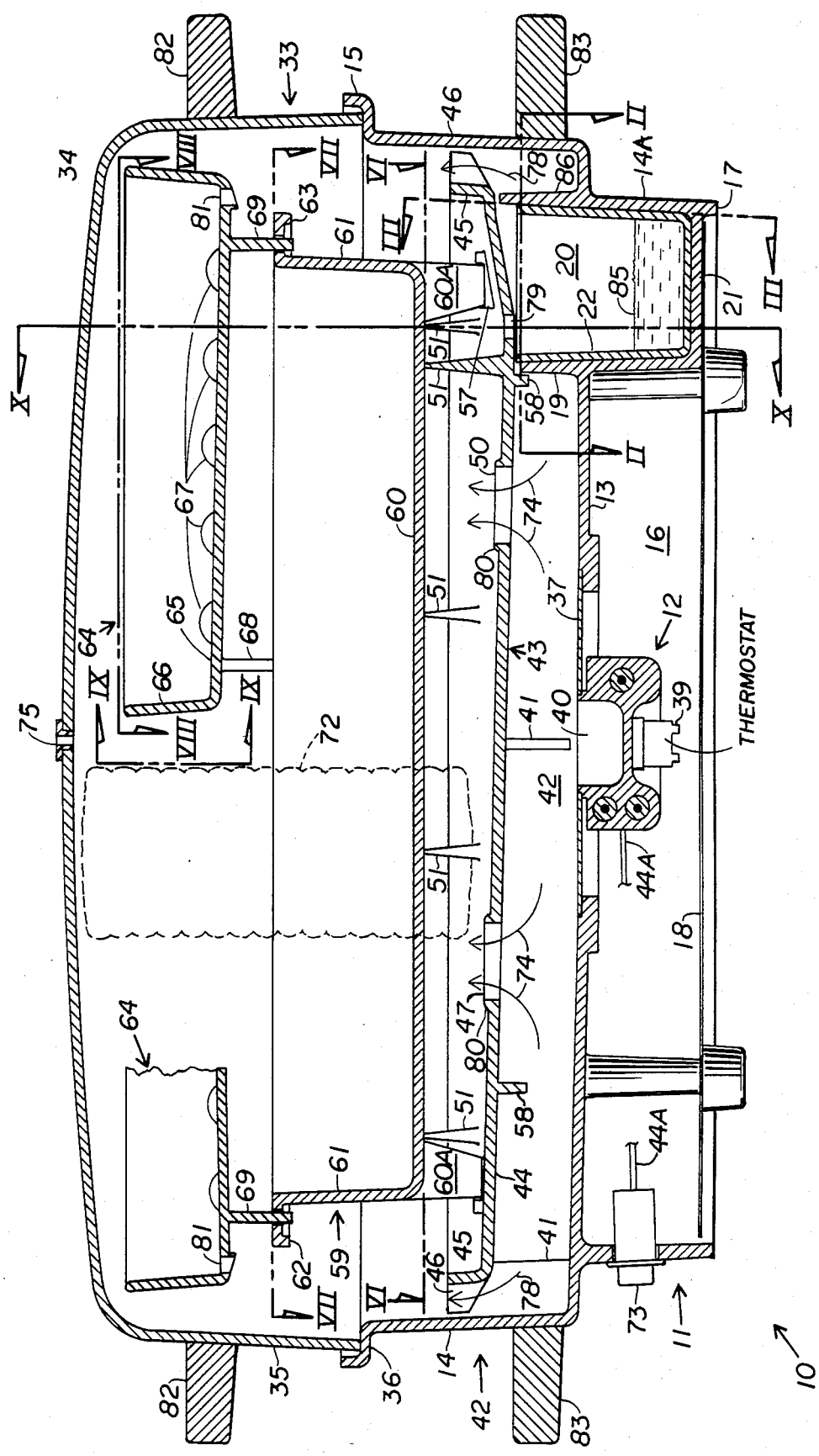
FIG. 1 is a vertical sectional view of a steamer in accordance with the teachings of the invention.

Referring now to FIG. 1 of the drawing, a steamer 10 is shown having a base 11 and a heater assembly 12 coupled to the underside of bottom wall 13 of base 11. A peripheral skirt 14 extends both downwardly from bottom wall 13 and upwardly therefrom to a peripheral lip 15. It can be seen in FIG. 1 that the portions of skirt 14 above and below wall 13 forms the side walls of the steamer 10. Also, the lower portion of skirt 14A also forms a support for steamer 10.

As also seen in FIG. 1, the heater assembly 12 is mounted to bottom wall 13 in a space or area 16 formed between bottom wall 13 and the lower or terminal edge 17 of skirt 14A. A removable bottom cover 18 may be provided closing off the open bottom of steamer 10 as seen in FIG. 1. If desired, as seen in FIG. 1, the lower portion of skirt 14 may be offset inwardly from the upper portion. Shown is a system utilizing molded bosses which locate and support the bottom cover.

Figure 2:
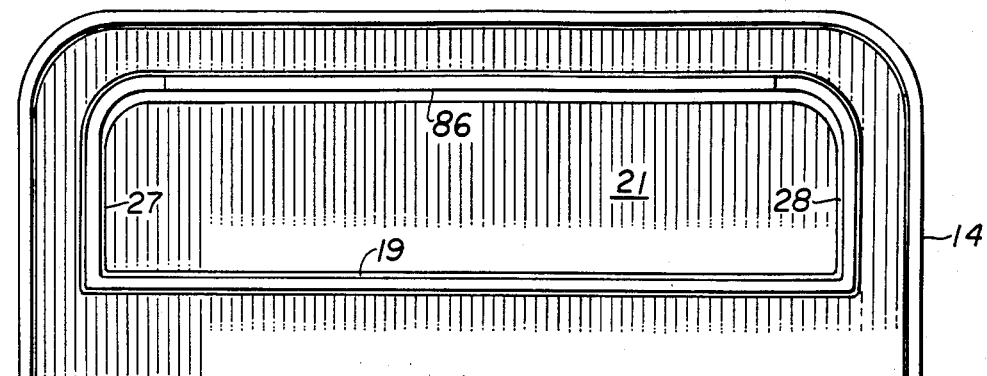
FIG. 2 is a view of a portion of the steamer of FIG. 1 taken along lines II—II thereof with the cup removed therefrom.

A partition wall 19 in conjunction with lower wall 21, and skirt 14A and wall segment 86 form a liquor receiving 20. Partition wall 19 extends both above and below bottom wall 13 and is spaced inwardly from said skirt 14. See FIGS. 1, 2 and 10. As seen in FIG. 2, reservoir 20 extends across base 11 (cup 22 to be discussed- has been removed).

Figure 3:
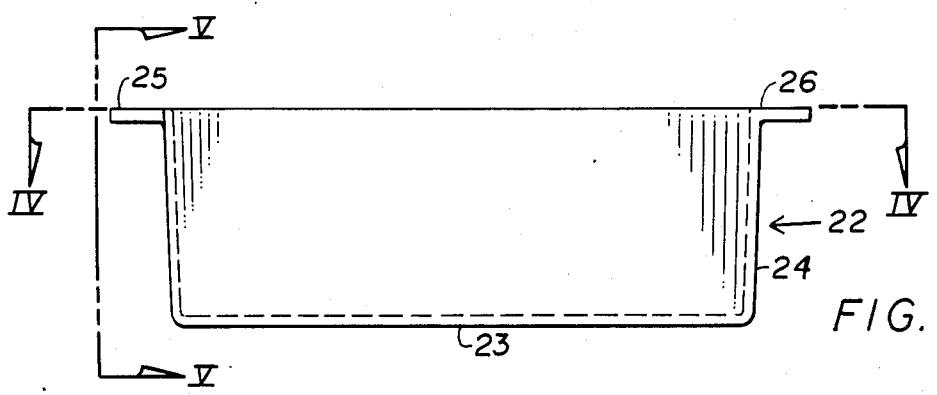
FIG. 3 is a vertical view of the cup alone of the steamer of FIG. 1.
Figure 4:
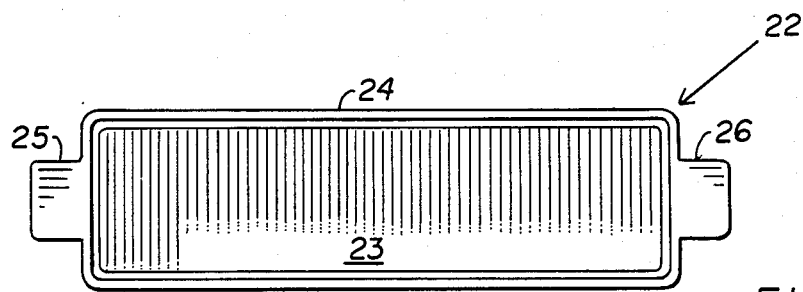
FIG. 4 is a view taken along lines IV—IV of FIG. 3.
Figure 5:
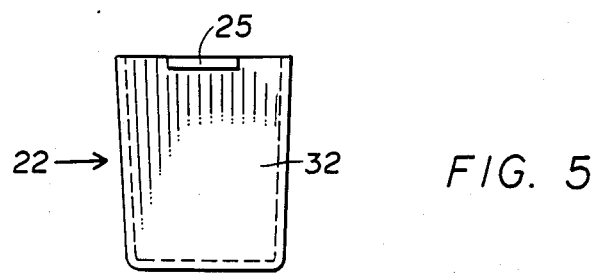
FIG. 5 is a view taken along lines V—V of FIG. 3.
Figure 10:
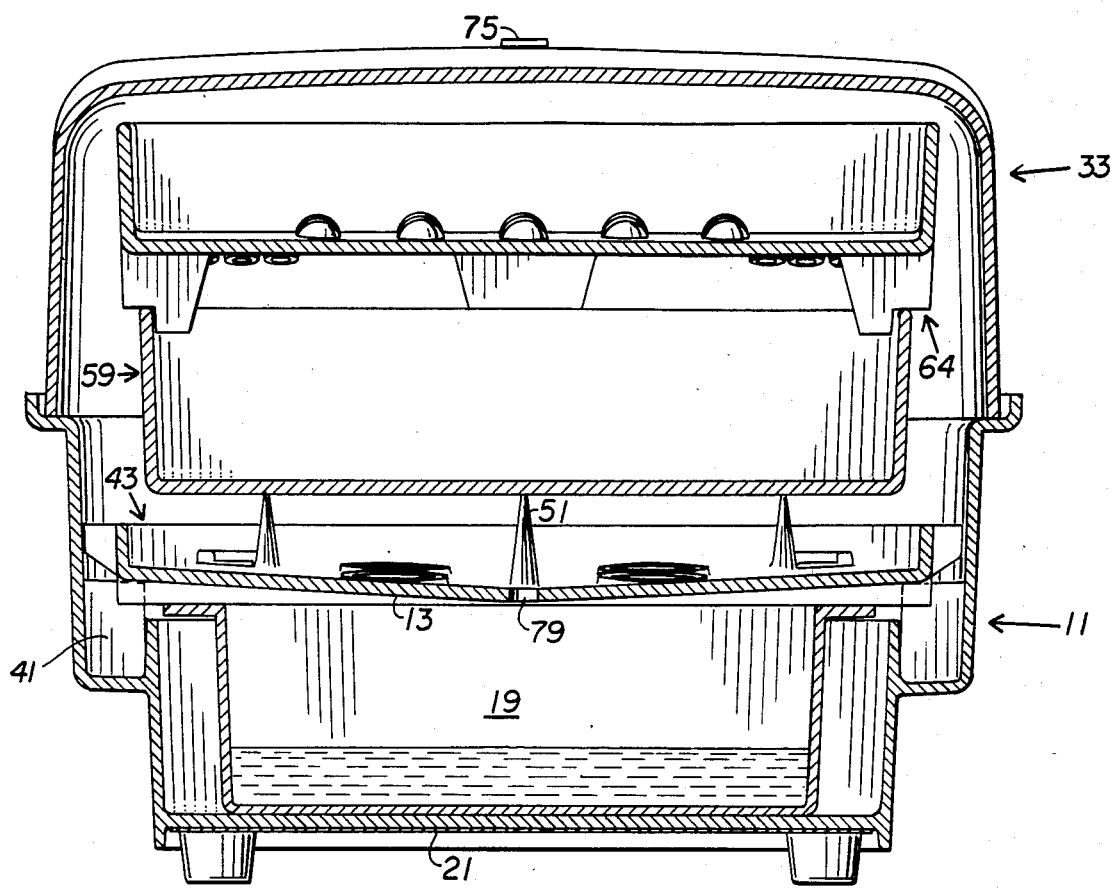
FIG. 10 is a view taken along lines X—X of FIG. 1.

Referring again to FIG. 1, and with particular reference to FIGS. 3 and 4, cup 22 is mounted in reservoir 20 and is removable therefrom as will be discussed. As can be seen in FIGS. 3 and 4, cup 22 includes a bottom wall 23, a peripheral side wall 24, and handle portions 25,26 at opposite ends of the top of side wall 24. As seen in FIGS. 1, 2 and 10, walls 19,21,27,28 and 86 integrally form reservoir 20 which can be used as is or which provides space (a nest) for liquor reservoir 22, a separate and removable cup-like item.

A cover 33, which may be dome-shaped, closes off the steamer 10 and is comprised of an upper wall 34 and a downwardly extending peripheral wall 35 adapted to rest on the peripheral flange 36 formed by lip 15 (FIG. 1).

Bottom wall 13 is normally open at substantially the center thereof but closed off by a heater plate 37 to which heater assembly 12 is attached. A conventional thermostat 39 may be provided in conjunction with heater assembly 12 and a well or cavity 40 is provided in the heater assembly 12 fluidly communicating with the area of steamer 10 above bottom wall 13.

It can very well be seen in FIG. 1 that partition wall 19 extends a short distance up from bottom wall 13. One or more supports or walls, such as wall 41, may extend upwardly from bottom wall 13. Walls 14,19,27,28 and 86 above bottom wall 13 form a fluid tight reservoir 42. A deflector tray 43 (see also FIG. 6) is supported within steamer 10 on the upper surfaces of supports 41 and wall 86 as shown. Tray 43 has a bottom wall 44 and a peripheral upstanding lip or wall 45. Spacer flanges 46 extend outwardly from wall 45 for spacing tray 43 from the outer peripheral wall 14.

Figure 6:
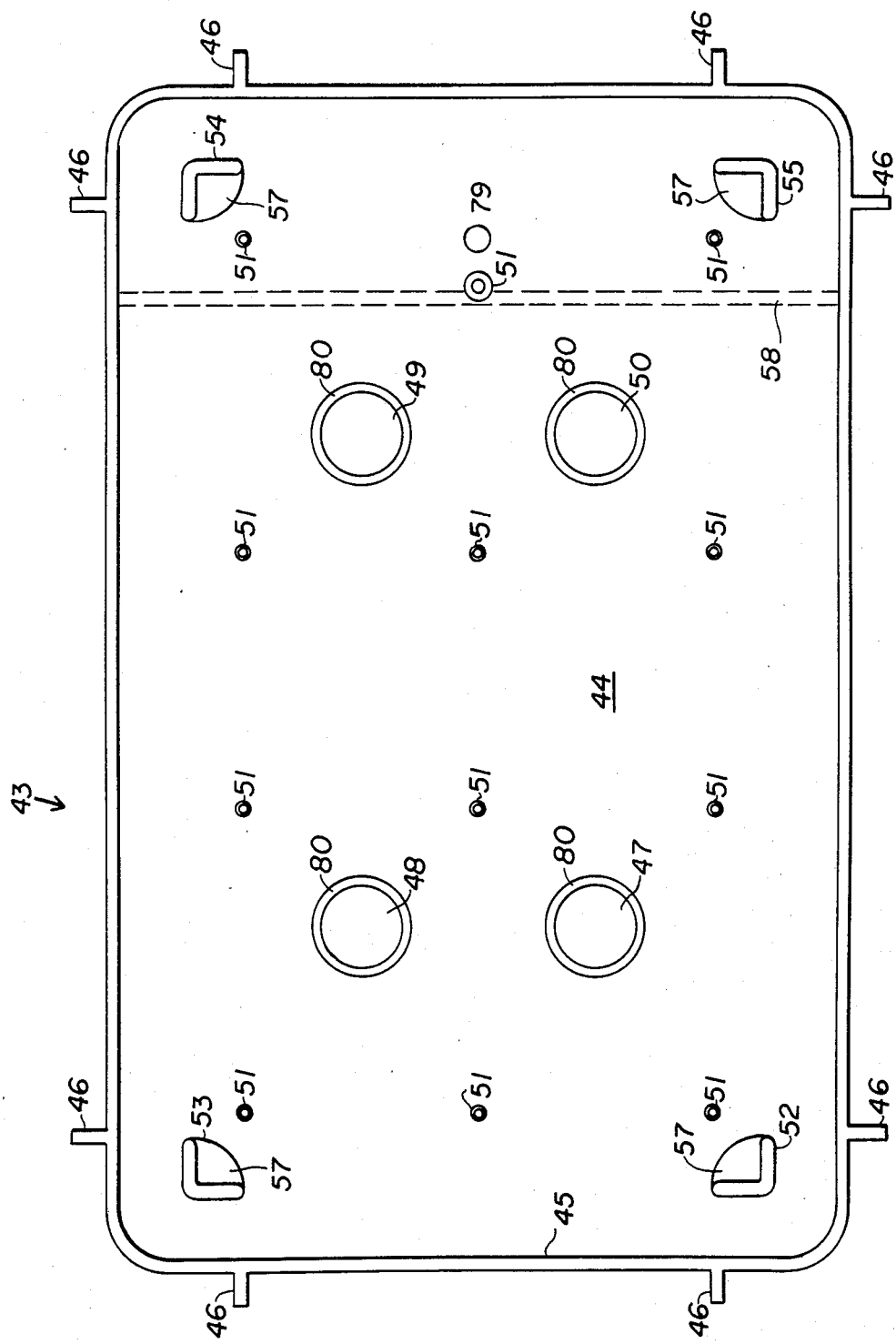
FIG. 6 is a top plan view of the deflector tray alone of the steamer of FIG. 1.

A plurality of steam openings, such as four openings 47-50, are provided in tray 43 (FIG. 6). A plurality of members 51, which may taper generally to a point as seen in FIG. 1, extend upwardly on tray 43 and a plurality, such as four, of locators 52 to 55, are provided at each corner of tray 43 and are generally L-shaped, as shown. As can be seen in FIGS. 1 and 10, tray 43 has bottom 44 which is sloped such that any liquid on same will gravitate to hole 79 for reasons to be discussed. Locators 52 to 55 may each include support pads 57, all of which are in the same plane. The underside of tray 43 may also include downwardly extending ribs 58 which act to strengthen the tray as well as to act as drip lips as shown.

Figure 7:
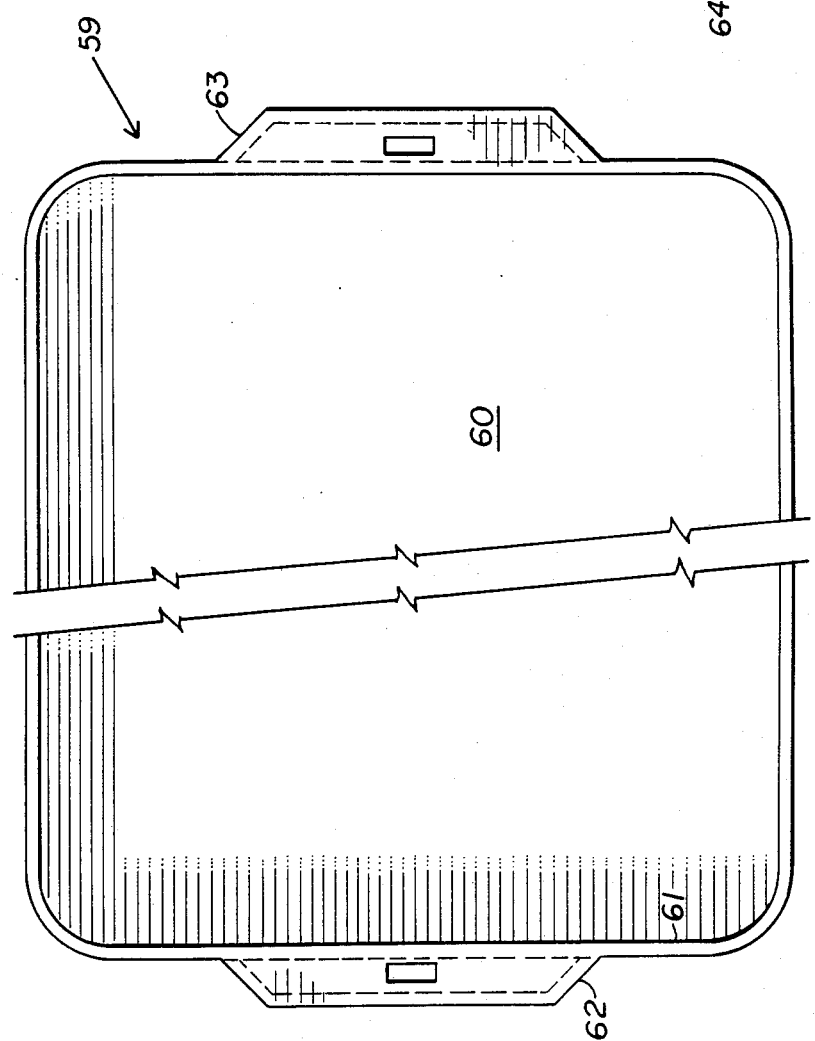
FIG. 7 is a top plan view of the main bowl of the steamer of FIG. 1 removed therefrom.

The support pads 57 support a relatively large capacity main bowl 59, such as a rice bowl, having a bottom wall 60 with legs 60A depending downwardly therefrom and a peripheral upstanding side wall 61. A pair of handles 62,63 are provided on each side of wall 61 as shown in FIG. 7. Preferably each handle has a rectangular opening to receive one leg of a tray 64 and for locating.

One or more food trays may be supported in steamer 10. Thus, as seen in Figure 1, an upper food tray 64 may be supported on main bowl 59. As seen, a second identical tray 64 may be supported on the left side of bowl 59 in FIG. 1, if desired.

Each tray 64 includes a bottom wall 65 (see also FIG. 8) and an upstanding peripheral wall 66 (which may flare outwardly, if desired). A plurality of spaced spacer bumps 67 are optionally provided on the upper surface of bottom wall 65.

A plurality of support legs 68, such as two, extend downwardly from the undersurface of bottom wall 65 (FIG. 9) and at each corner of one side of the bottom of bowl 59. A third support leg 69, spaced from legs 68, is provided on the undersurface of bottom wall 65 opposite legs 68 and has a notch configuration; the notch 70 providing cooperation with rectangular opening in main bowl handle 63 thus supporting food tray 64 on top of one side of bowl 59 (the second tray 64, if desired, would be merely supported in like manner on the handle 62 on the left side of bowl 59 in FIG. 1 wherein a portion of a like tray 64 is shown).

The bottom wall 65 referred to previously is found on the upper food tray 64.

In operation, water is placed in the steamer 10 on bottom wall 13 and retained therein, water flowing into wall 40. Tray 43 is placed in position with hole 79 over reservoir 20. Switch 73 on skirt 14A (FIG. 1) is coupled to heater assembly 12 via electrical conduit 44A in any suitable manner, as is well known in the art, activates assembly 12 to heat the water in well 40 and thus the water on wall 13. Steam is produced and rises from the water on wall 13 when the water boils and exits upwardly through openings 47-50 of the deflector tray as shown by arrows 74. Cover 33 may be ported or vented at vent 75 to allow release of steam. This allows escapement of vapor for circulation of steam and prevents excessive pressure build-up within the steamer 10.

Obviously, reservoir 20 need not be used by the user as liquor 85 can be caught in removable cup 22. Thus, there is no need to lift the steamer 10 to empty liquor 85.

Although four holes 47 to 50 are shown, obviously more or less than four may be provided. Steam escapes through these holes 47 to 50 as well as past the peripheral space provided by spacer flanges 46 as indicated by arrows 78 in FIG. 1. This provides even distribution of steam to any food load.

As clearly seen in FIG. 10, a number of separate compartments for steaming different foods are presented in the steamer of my invention. There is a main area provided by the wide bowl 59 and a lower wide stack tray 43 which can be used to support food thereon, either with bowl 59 in place or when bowl 59 is removed, e.g., to support ears of corn on the cob (shown in dotted lines in FIG. 1 as cob 72) or similar foods placed vertically upright and spiked on members 51. Each ear and all surfaces of each ear receives steam for even quick cooking.

Figure 8:
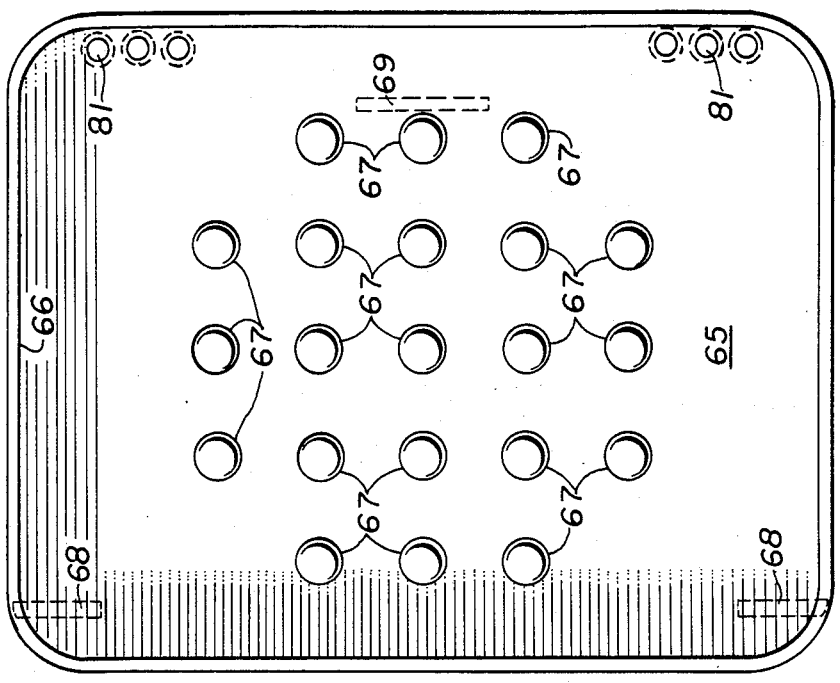
FIG. 8 is a top plan view of the food tray of the steamer of FIG. 1 removed therefrom.
Figure 9:
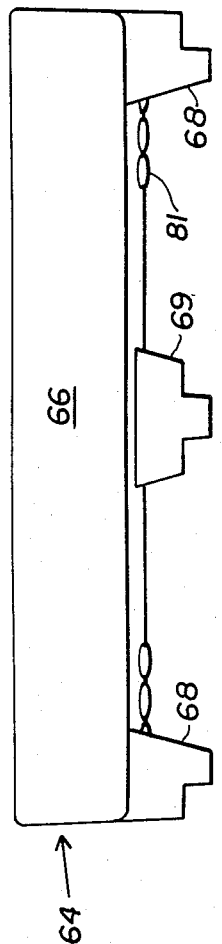
FIG. 9 is a view taken along lines IX—IX of FIG. 1.

A third and fourth food area is provided by the upper stack trays 64, one of which is shown in detail in FIGS. 8 and 9.

The liquor return tray or cup 22 catches liquor from the steaming food and can be removed from reservoir 20. Liquor 85 can be used as a base for making sauces or gravies, or used alone as a flavoring agent or to cook other foods, such as to steam rice. If desired, liquor 85 can accumulate directly in reservoir 20 and not cup 22.

As seen in FIG. 1, due to the particular conturing of the tray bottom and walls, the tray 43 slopes to the right. A drain hole 79 communicates with reservoir 20 (and cup 22 if placed therein) so that all liquid flows to reservoir 20.

Figure 11:
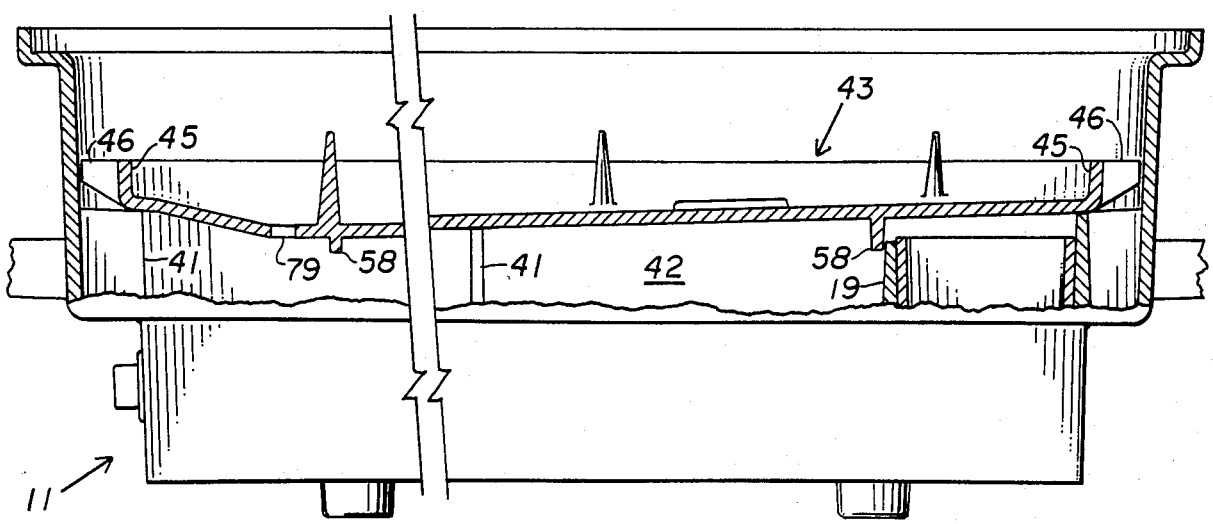
FIG. 11 is a view similar to FIG. 1, partly in section, showing a portion of the steamer of FIG. 1 with the bottom tray reversed 180 degrees from the FIG. 1 position.

It can be seen in FIG. 11 that tray 43 can be placed in steamer 10 180 degrees from its FIG. 1 position so that hole 79 now communicates with the water on wall 13. In this manner, the tray 43 is aligned so that condensate water from the non perforated vessel containing food being steamed is returned to the boiling water reservoir.

Deflector tray position shown in FIG. 1 provides for routing liquors and condensate to reservoir 20 so that no food liquors, from steaming, reaches the heater assembly surface and thus cannot burn thereon.

Holes 47-50 also serve as a convenient gripping area to remove tray 43. As seen in FIG. 1, the immediate area of tray 43 surrounding each hole 47-50 may be raised, as at annular ring 80, so that liquid, either condensate or liquor, or both, won't enter holes 47-50 but flow to exit hole 79. Thus, each hole 47-50 may have such areas 80.

Bowl 59 can be used to steam foods which do not require draining, such as rice, scrambled eggs, poached fish, stuffed chicken, etc.

The trays 64 may have sloping bottoms, as seen in FIG. 1, and bumps 67 are optional. This allows the food thereon to be supported but allows drainage from the food to one or more drain holes 81 therein (see also FIG. 8), the drained liquid flowing via deflector tray down to reservoir 20. Also, bowl 59 in FIG. 1 may be removed from steamer 10 and one or two trays 64 may be supported directly on top of tray 43. If supported on bowl 59, legs 68,69 provide proper location and spacing for steam flow to the foods and drainage past bowl 59 to deflector tray 43. Of course, bowl 59 is supported on the rests 52–55 of tray 43 as stated earlier (FIG. 6). Foods to be stemed in tray 64 may include such varied items as shrimp, sausage, assorted vegetables.

It can be appreciated that the user can also place any suitable household item such as a sauce pan, loaf pan, cookie tin, steam basket, etc., of suitable size, inside steamer 10 directly on the spikes 51 of tray 43.

The amount of water poured into the water reservoir provided by walls 14,19,27,28,86 (FIG. 2) is determined by the food load and steaming time desired. As heretofore discussed, rice, for example, may be placed in bowl 59 supported on tray 43 with shrimp placed in one tray 64 and cauliflower in another tray 64 on bowl 59. Cover 33 is then placed in position and switch 73 activated to heat the water. Steam that is generated passes through holes 47–50 and around tray 43 as indicated by arrows 74,78. Steam condenses on the foods heating the same. Condensate drainage from the food on the tray or trays 64 drains via holes 81 and drips down past the outside of bowl 59 onto deflector tray 43 where it runs to and out hole 79 to reservoir 20. Condensate formed on the outside of bowl 59 also flows to tray 43 and out hole 79. Other condensate, formed on the inside surfaces of cover 33 and the side walls of the bottom housing portions, moves to the boiling water area on wall 13 where, as clear, less hard water, it may boil again extending the steaming time dependent upon a room temperature vs, condensate amount plot. The cooler the room, the greater the amount of condensation that takes place on the walls of the steamer 10.

If steamer 10 is used without trays 64, to cook rice, etc. in bowl 59, tray 43 is reversed in steamer 10 as heretofore discussed with respect to FIGS. 1 and 11 so that hole 79 is over the water chamber above wall 13. This provides for all condensate, clear water, with less precipitants than before, to return to the boiling water reservoir to be again converted to steam thus extending the total steam time per amount of original water used. Compensation takes place again making up for a very large or cold food load. See below. In practice, approximately one extra cup of water to steam is accomplished (i.e., 4 cups of steam time from 3 cups of water). This 'extra cup' also has the advantage of causing less precipitation of calcium, magnesium and other minerals, since, once boiled into steam and condensed, such water has already given up its minerals.

Thermostat 39 is shown as closely coupled to well 40. As long as water is in the water reservoir above wall 13 the temperature of heater assembly 12 will exceed 212 degrees F by only a few degrees. If the reservoir and heater well 40 boil dry, there will be a fast rise in temperature which is sensed by thermostat 39 to open the same and cut off the current to heater assembly 12.

Switch 73 may be lighted and electrically coupled to thermostat 39 and heater assembly 12 so that , when heater 12 is energized, the light of switch 73 lights and when the thermostat opens and the heater is not energized, the light is not lit indicating to the user that the cooking cycle is complete and switch 73 should be shut off or the steamer 10 unplugged. Also, an audible signal designed to signal the end of the cooking cycle may be provided coupled to thermostat 39. The foregoing are obviously techniques well known in the art and require no further explanation.

The heater assembly 12 is of course sealed off from the water reservoir above wall 13 via plate 37 and suitable heater insulation or gaskets or the like may be provided. Any suitable heater assembly may be used. Plate 37 may be stainless steel, for example, and silicone rubber used as a seal.

Removable cup 22 may be marked with indicia to indicate its internal capacity. The handles 25, 26 of cup 22 assist in removal of the cup 22 from reservoir 20.

Any suitable materials may be used such as various metals or plastics that can withstand the temperatures used. Such are known in the art. The notching in feet or legs 68,69 of trays 64 allows them to be oriented only one way on bowl 59. This avoids any problems of orientation by the user. While switch 73 is shown as being a lighted switch and mounted on a side wall of base 11, a separate light and separate switch mounted on the front wall of base 11 are also contemplated.

It can be seen that I have described a steamer providing a plurality of differing cooking areas. The major part of condensate formed on the inside of the cover of my steamer and the interior walls of the housing is returned to the water reservoir where it is re-boiled and thus re-steamed producing more steam with less water. Scorching of the heater is prevented and valuable cooking liquors may be captured.

Although tray 43 is a deflector tray deflecting steam upwardly and liquors/condensate downwardly, it can also be used to cook certain foods, such as whole potatoes, cornon the cob, artichokes, asparagus bundles directly with uniform consistency. Foods are placed on the spikes 51 in the vertical or upright position.

If desired, lifting handles 82 (FIG. 1) may be provided on opposite sides of cover 33 for lifting the same. Handles 82 may be insulated in any suitable manner from cover 33. If desired, similar handles 83 may be provided on the outside of wall 14 for lifting the entire steamer 10. However, the offset configuration of walls, bottom to top, provides easy lifting when needed.

Obviously the various components may be of any suitable dimensions. Any suitable heater may be used, such as a 120 Volt, 600 Watt heater.

Obviously trays 64 and bowl 59 may be provided with or without spacer bumps 67 or even with or without drain holes. Cover 33 may be of transparent material such as polycarbonate plastic.

There is thus described an efficient and versatile cooking device for steaming various foods while producing cooking liquors that can be used for sauces or the like.

It is seen that no adjustable thermostat is provided since none is needed. The philosophy of operation is to permit all of the water placed in the steam cavity to go through a phase change to steam, at which point the builtin non-adjustable thermostate 39 will shut off the heater assembly 12, i.e. when the device boils dry.

In operation, any and all condensation of steam that occurs in the lid (top) and around the peripheral walls of this device will flow back toward the heater assembly 12 due to the inherent construction of the steamer. The actual amount of condensation is dependent upon the environment in which the device is employed. For instance, condensation will occur since the outer surface of the cover and walls will be slightly relatively cooler. Since more condensate can occur in the cooler rooms, there is more water available for resteaming thus extending the operable period of the device per given amount of water placed in the steaming cavity at cooking commencement.

Whereas in a warm room, say 85 degrees, less condensation will occur therefore less water flows back to the steaming cavity thereby shortening the length of the available cooking cycle.

Since certain changes may be made in the above apparatus without departing from the scope of the invention herein involved, it is intended that all matter contained in the above description and shown in the accompanying drawings shall be interpreted as illustrative and not in a limiting sense.

I claim:

1. In a steamer comprising a housing having a base, a boiling water reservoir in the base, a heater coupled to the water reservoir for heating the same, and a bottom tray mounted in the steamer, the improvement which comprises:

said tray being loosely mounted within the steamer above the water reservoir, said tray having at least one aperture therethrough fluidly communicating with the water reservoir and a second aperture therethrough said tray on one side thereof remote from said first mentioned aperture in non-fluid communication with the water reservoir, said tray having spacer means thereon both spacing said bottom tray from inner side walls of the water housing and deflecting steam produced by the boiling of water in the water reservoir upwardly within said steamer including a food liquor reservoir mounted in said base remote from the water reservoir and in non-fluid communication therewith, said tray being reversible within said steamer so that, in a first position, said second aperture therein is in fluid communication with said liquor reservoir, and, in a second position, said second aperture therein is in fluid communication with the water reservoir.

2. In the steamer of claim 1 including a plurality of spikes mounted on said tray extending vertically upwardly therefrom and tapering to a point.

3. In the steamer of claim 1 including a large capacity bowl mounted on top of said tray in said steamer.

4. In the steamer of claim 3 wherein said bowl is imperforate.

5. In the steamer of claim 4 wherein a plurality of spikes are mounted on said tray extending vertically upwardly therefrom tapering generally to a point.

6. In the steamer of claim 3 including at least one food tray mounted on the top of said bowl within said steamer.

7. In the steamer of claim 6 wherein said bowl includes a peripheral lip and a pair of handles on opposite sides of said bowl extending horizontally outwardly from said lip including openings which cooperate with food trays.

8. In the steamer of claim 7 wherein said food tray includes a plurality of spaced brackets downwardly depending from its underside having cut-out portions thereinreceiving the lip and at least one handle of said food tray therein for supporting said food tray on top of said bowl.

9. In the steamer of claim 8 including a second food tray similar to said first food tray supported in like manner on the other one of said handles of said bowl and said lip thereof.

10. In the steamer of claim 7 wherein each of said food trays includes a bottom wall and an upstanding peripheral wall, and including a plurality of spaced bumps on the upper surface of the bottom wall of said food trays.

11. In the steamer of claim 7 wherein each of said food trays includes a bottom wall and an upstanding peripheral wall, and at least one aperture extending through one side of said bottom wall fluidly communicating with the interior of said steamer away from the interior of said bowl, each of said food trays having bracket means on the bottom thereof for engaging the top of said bowl and supporting said food tray so that any liquids thereon flow to and out of said aperture therethrough.

12. In the steamer of claim 11 wherein said aperture in said food tray fluidly communicates with the portion of said first mentioned tray having said first mentioned aperture therein whereby food liquors may drip from said food tray past said bowl and through the aperture in said bottom (deflector) tray.

13. In steamer of claim 12 including a food liquor reservoir mounted in said base remote from said water reservoir and in non-fluid communication therewith, said food liquor reservoir being in fluid communiation with said second aperture in said bottom tray for receiving food liquors therefrom.

14. In the steamer of claim 1 including a removable cup mounted in said food liquor reservoir for removing food liquors from said steamer without need for tipping the same.

15. In the steamer of claim 1 wherein a vented cover is mounted over said housing.

16. In the steamer of claim 1 wherein said bottom tray is so shaped that liquids therefrom flow to said second aperture.

17. In the steamer of claim 1 further including lighted switch means coupled to said heater.

18. In a steamer comprising a housing having a base, a boiling water reservoir in the base, a heater coupled to the water reservoir for heating the same, and a bottom tray mounted in said steamer, said tray allowing passage of steam from the water reservoir above said tray, a food liquor reservoir in said base isolated from the water reservoir, and condensate directing means on said tray for exclusively directing food liquor and steam condensate to either the water reservoir or said food liquor reservoir wherein said condensate directing means is defined by a sloped contour of said tray and an aperture at a lowest point of said sloped tray to direct condensate therethrough, said aperture offset from a geometrical center of said tray such that reorientation of said tray allows fluid communication to a different situs therebelow, and said reservoirs are located strategically so that tray reorientation provides communication with a different reservoir.

19. In a steamer comprising a housing having a base, a boiling water reservoir in the base, a heater coupled to the water reservoir for heating the same, and a bottom tray mounted in the steamer, the improvement which comprises:

said tray removeably mounted wtihin the steamer above the water reservoir, said tray allowing an area above said tray to communicate with the water reservoir and an aperture through said tray off center, a food liquor reservoir mounted in said base remote from the water reservoir and in non-fluid communication therewith, said tray being reversible within said steamer so that, in a first position, said aperture therein is in fluid communication with said liquor reservoir, and, in a second position, said aperture therein is in fluid communication with the water reservoir.

* * * * *